United States Patent
Morrison

(10) Patent No.: US 10,615,541 B2
(45) Date of Patent: Apr. 7, 2020

(54) SYSTEM AND METHOD FOR BLIND ALIGNMENT TO DOCK AN INFORMATION HANDLING SYSTEM

(71) Applicant: DELL PRODUCTS, LP, Round Rock, TX (US)

(72) Inventor: Jason S. Morrison, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 129 days.

(21) Appl. No.: 15/098,056

(22) Filed: Apr. 13, 2016

(65) Prior Publication Data
US 2017/0302024 A1 Oct. 19, 2017

(51) Int. Cl.
| H01R 13/631 | (2006.01) |
|---|---|
| H01R 13/62 | (2006.01) |
| H01R 13/453 | (2006.01) |
| G06F 1/16 | (2006.01) |

(52) U.S. Cl.
CPC ....... *H01R 13/6315* (2013.01); *G06F 1/1632* (2013.01); *H01R 13/4538* (2013.01); *H01R 13/6205* (2013.01); H01R 2201/06 (2013.01)

(58) Field of Classification Search
CPC ...... G06F 1/1632; G06F 1/1601; G06F 1/203; G06F 1/5213; H01R 13/6205; H01R 13/5213; H01R 13/6315; H01R 13/4538
USPC ..................................................... 361/679.41
See application file for complete search history.

(56) References Cited

U.S. PATENT DOCUMENTS

| 5,862,036 A * | 1/1999 | Lin .................. G06F 1/1632 361/679.43 |
|---|---|---|
| 8,508,932 B2 | 8/2013 | Duval |
| 2012/0045931 A1* | 2/2012 | Carnevali ............ G06F 1/1632 439/544 |
| 2012/0162902 A1* | 6/2012 | Zhou .................... H01R 13/635 361/679.41 |
| 2014/0223065 A1 | 8/2014 | Jolda et al. |
| 2015/0043154 A1 | 2/2015 | Feldstein et al. |
| 2015/0277491 A1* | 10/2015 | Browning ............. G06F 1/1632 361/679.44 |
| 2015/0331452 A1 | 11/2015 | Byrne et al. |
| 2016/0069507 A1 | 3/2016 | Ardisana, II et al. |
| 2016/0072327 A1 | 3/2016 | Knutson et al. |
| 2016/0091925 A1 | 3/2016 | Ardisana, II et al. |

* cited by examiner

*Primary Examiner* — Jinhee J Lee
*Assistant Examiner* — Ingrid D Wright
(74) *Attorney, Agent, or Firm* — Larson Newman, LLP

(57) ABSTRACT

A docking station a first connector, a post, and a pop-out cover. The first connector is mounted to float within a first opening of a case of the docking station. The post is in physical communication with the case. The post provides a first alignment between the first connector and a second connector of an information handling system. The pop-out cover is in physical communication with the case and the post. The pop-out cover is biased in a first alignment stage, and transitions from the first alignment stage to a second alignment stage in response to a force exerted on the pop-out cover by a weight of the information handling system. The first connector is joined with the second connector in response to pop-out cover being placed in the second alignment stage.

17 Claims, 5 Drawing Sheets

SYSTEM AND METHOD FOR BLIND ALIGNMENT TO DOCK AN INFORMATION HANDLING SYSTEM

FIELD OF THE DISCLOSURE

This disclosure generally relates to information handling systems, and more particularly relates to blind alignment to dock an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

A docking station includes a first connector, a post, and a pop-out cover. The first connector is mounted to float within a first opening of a case of the docking station. The post is in physical communication with the case. The post provides a first alignment between the first connector and a second connector of an information handling system. The pop-out cover is in physical communication with the case and the post. The pop-out cover is biased in a first alignment stage, and transitions from the first alignment stage to a second alignment stage in response to a force exerted on the pop-out cover by a weight of the information handling system. The first connector is joined with the second connector in response to pop-out cover being placed in the second alignment stage.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
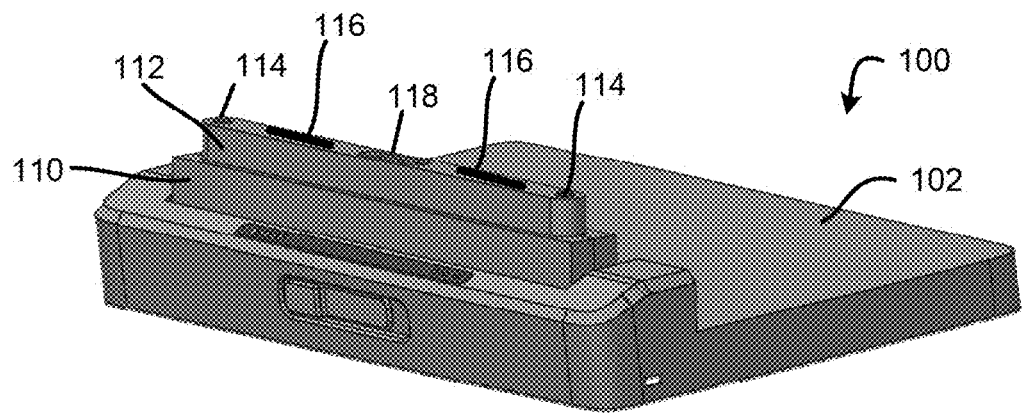
FIGS. 1-3 illustrate a docking station in accordance with at least one embodiment of the present disclosure.
Figure 2:
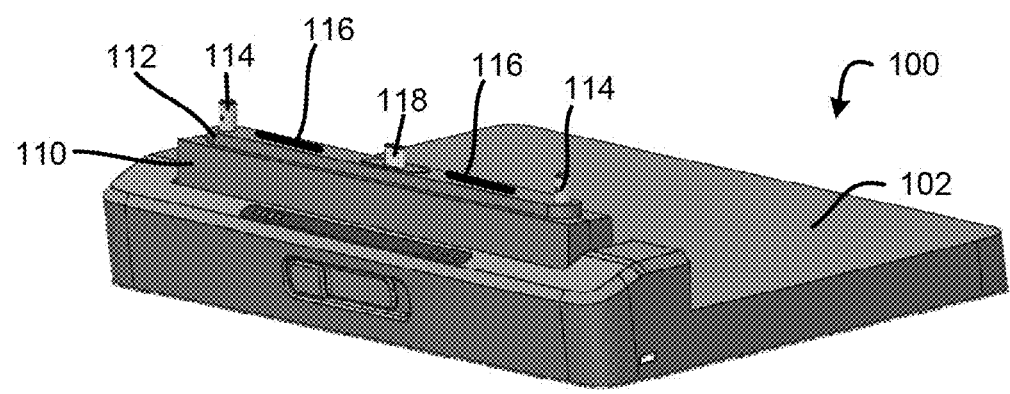
Figure 3:
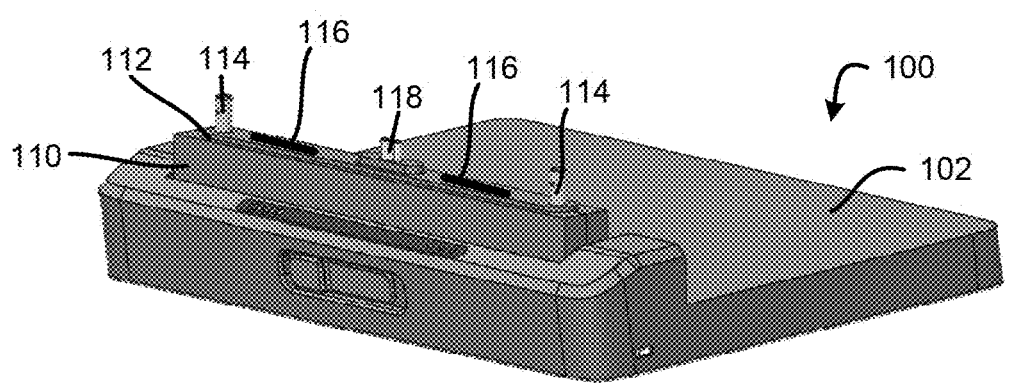

FIGS. 1-3 illustrate a docking station 100 for an information handling system in accordance with at least one embodiment of the present disclosure. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The docking station 100 includes a base 102, a case 110, a pop-out cover 112, posts 114, magnets 116, and a connector 118. The case 110 is in physical communication with the base 102. The pop-out cover 112 is in physical communication with the case 110. The posts 114 are in physical communication with the pop-out case, and can be located at opposite ends of a top surface of the pop-out case. The connector 118 is in physical communication with the pop-out cover 110, and is located substantially in the center of the top surface of the pop-out case. The magnets 116 are mounted within the pop-out cover 112, and each magnet is located between the connector 118 and a respective post 114. The case 110 can rotate between a table mount position, as shown in FIGS. 1-3, and a wall mount position. In the table mount position, the case 110 extends in perpendicular direction away from the base 102. In the wall mount position, the case 110 extends in a parallel direction along the base 102. In an embodiment, the connector 118 can be a type-C universal serial bus (USB) connector.

During operation, the docking station 100 can be placed in one or more alignment stages while in either the table mount position or the wall mount position. The operation of the components of the docking station 100 is substantially similar in both the table mount and the wall mount position. Therefore, for brevity and clarity the operation of the docking station 100 will be discussed only with respect to the table mount position of the case 110. In a first alignment stage, shown in FIG. 1, the pop-out cover 112 extends out of the case 110, and surrounds the posts 114 and the connector 118. In a second alignment stage, shown in FIG. 2, the pop-out cover 112 can partially slide within the case 110, which can cause the posts 114 and the connector 118 to extend from the pop-out cover. In an embodiment, if an information handling system connecting with the docking station includes a cover, folio, or like, the pop-out cover 112 can be placed in a third alignment stage to account for the additional thickness of the cover. In the third alignment stage, the pop-out cover 110 slides further within the case 110, as compared to the second alignment stage, such that the posts 114 and the connector 118 can extend further from the top surface of the pop-out cover.

Figure 4:
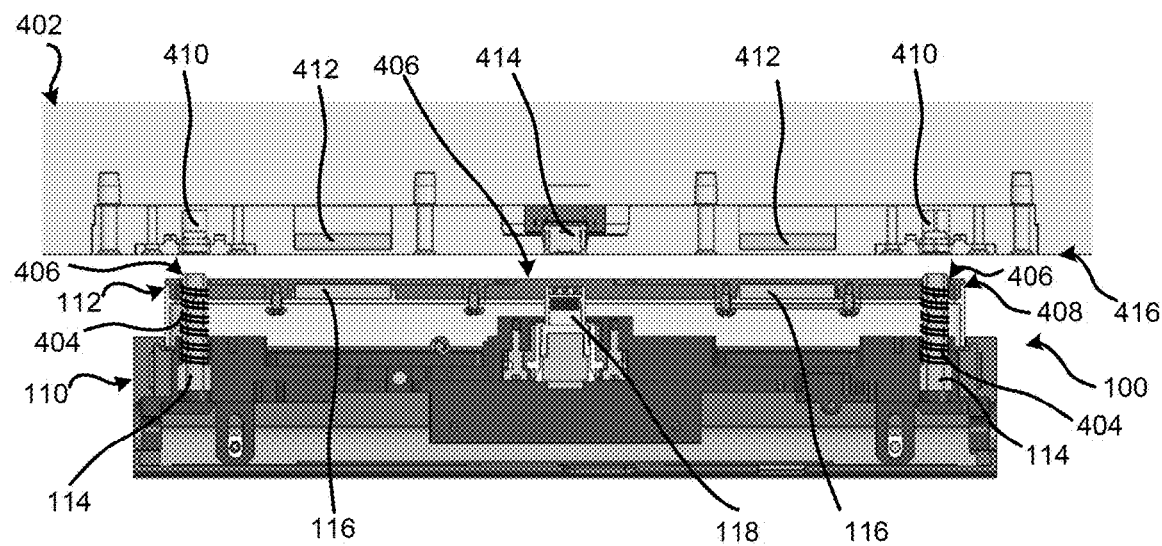
FIGS. 4-8 illustrate a cross section of the docking station and an information handling system in different alignment stages in accordance with at least one embodiment of the present disclosure.

FIGS. 4-8 illustrate a cross section of the docking station 100 and an information handling system 402 in different alignment stages in accordance with at least one embodiment of the present disclosure. Referring now to FIG. 4, the docking station 100 includes springs 404 around the posts 114, and openings 406 in a top surface 408 of the pop-out cover 110 to enable the posts and the connector 118 to extend out of the pop-out cover. The posts 114 are in physical communication with both the case 110 and the pop-out cover 112. In an embodiment, each of the springs 114 is wrapped around a respective one of the posts 114, and is disposed between the case 110 and a back side of the top surface 406. However, in another embodiment, the springs 114 can be located at a different location than around the posts 114, but still be disposed in between the case 110 and the pop-out cover 112. The springs 114 bias the docking station in the first alignment stage with the pop-out cover 112 extended from the case 110. The information handling system 402 includes openings 410, magnets 412, and a connector 414. The openings 410 are located within a bottom surface 416 of the information handling system 402, are located at opposite ends of the information handling system, and can be spaced the same distance apart from each other as the posts 114 of the docking station 100 are space from each. The connector 414 is substantially located in in the center of the information handling system 402. The magnets 412 can be mounted within the information handling system 402 and in close proximity to the bottom surface 416 of the information handling system.

Additionally, each opening 410 and each magnet 412 is located the same distance from the connector 414 as a corresponding magnet 116 and post 114 from the connector 118 in the docking station 100. In an embodiment, the connector 414 can be a type-C universal serial bus (USB) connector. The type-C USB connectors 118 and 414 can have a small tolerance for proper alignment, such that the connectors need to closely align before they can be joined together. In the first alignment stage, the information handling system 402 is placed in close proximity to the docking station 100, and the magnets 412 of the information handling system can be roughly aligned with magnets 116 of the docking station 100.

Figure 5:
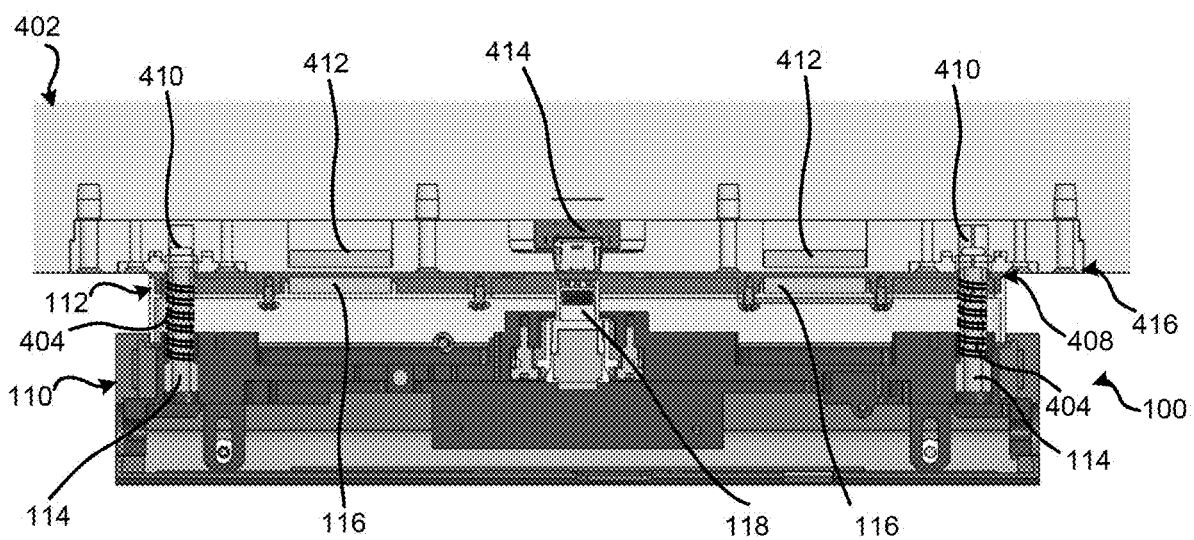

Referring now to FIG. 5, as the information handling system 402 is placed closer to the docking station 100, the magnets 116 within the pop-out cover 112 can attract the magnets 412 within the information handling system 402. In this situation, as the bottom surface 416 of the information handling system 402 is placed in physical communication with the top surface 408 of the pop-out cover 112, the attraction between the magnets 116 and 412 can provide a rough alignment of the posts 114 with the openings 410 and the connector 118 with the connector 414. The weight of the information handling system 402 can exert a force downward on the pop-out cover 112, such that the pop-out cover can slide a little bit within the case 110 and the posts 114 can slightly extend through the top surface 408 of the pop-out cover toward the openings 410 in the bottom surface 416 of the information handling system 402.

Figure 6:
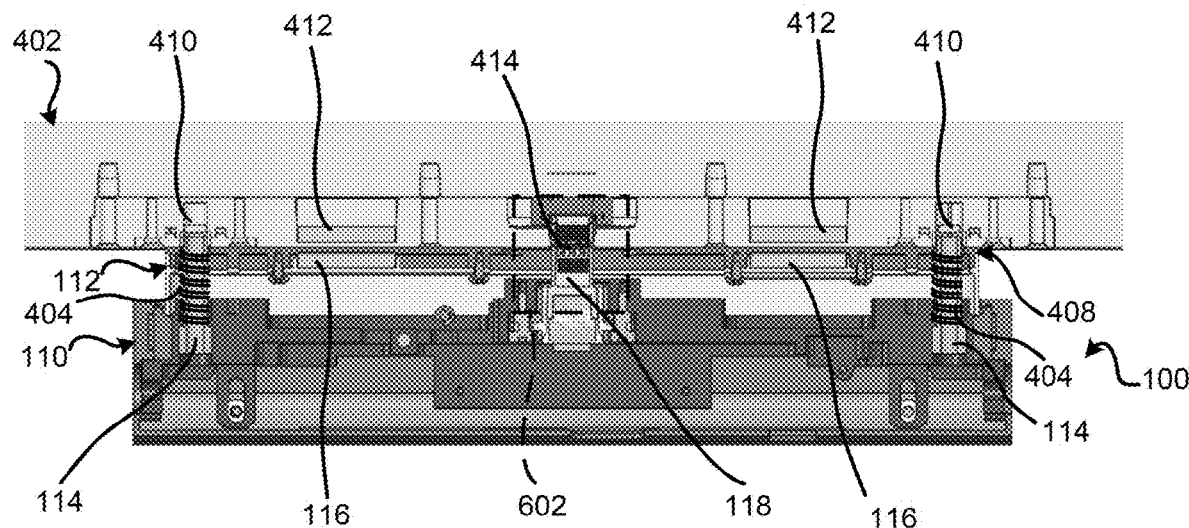

Referring now to FIG. 6, as a user allows more weight of the information handling system 402 to rest on the pop-out cover 112, the information handling system can exert a downward force on the pop-out cover which causes the springs 404 to start to compress. The compression of the springs 404 can allow the pop-out cover 112 to slide further within the case 110, and allow the posts 114 to extend further through the top surface 408 of the pop-out cover. The posts 114 can extend within the openings 410 of the information handling system 402. In an embodiment, the posts 114 sliding within the openings 410 can provide a tighter alignment of the connectors 118 and 414, as shown in greater detail in box 602 shown in FIG. 7, as compared to the alignment based only on the magnets 116 and 412.

Figure 7:
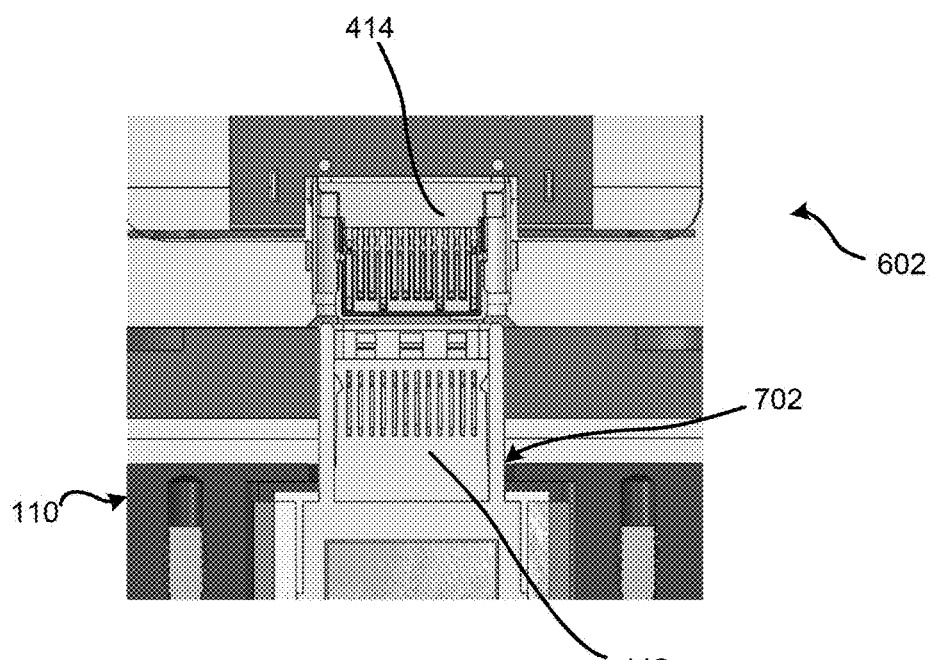

Referring now to FIG. 7, at this point in the alignment, the connectors 118 and 414 can have close alignment, however the connector 118 may need to move left or right, and/or forward or backward to allow connector 414 to be completely inserted within connector 118. Thus, the case 110 can include an opening 702 that is slightly larger than connector 118 to allow the connector 118 to move left or right, and/or forward or backward during the final alignment stage, as will be discussed with respect to FIG. 8 below. One of ordinary skill in the art will recognize that the directions left, right, forward, and backward are provided for clarity with respect to the figures. However, the descriptor for the direction of move can change without varying from the scope of the disclosure.

Figure 8:
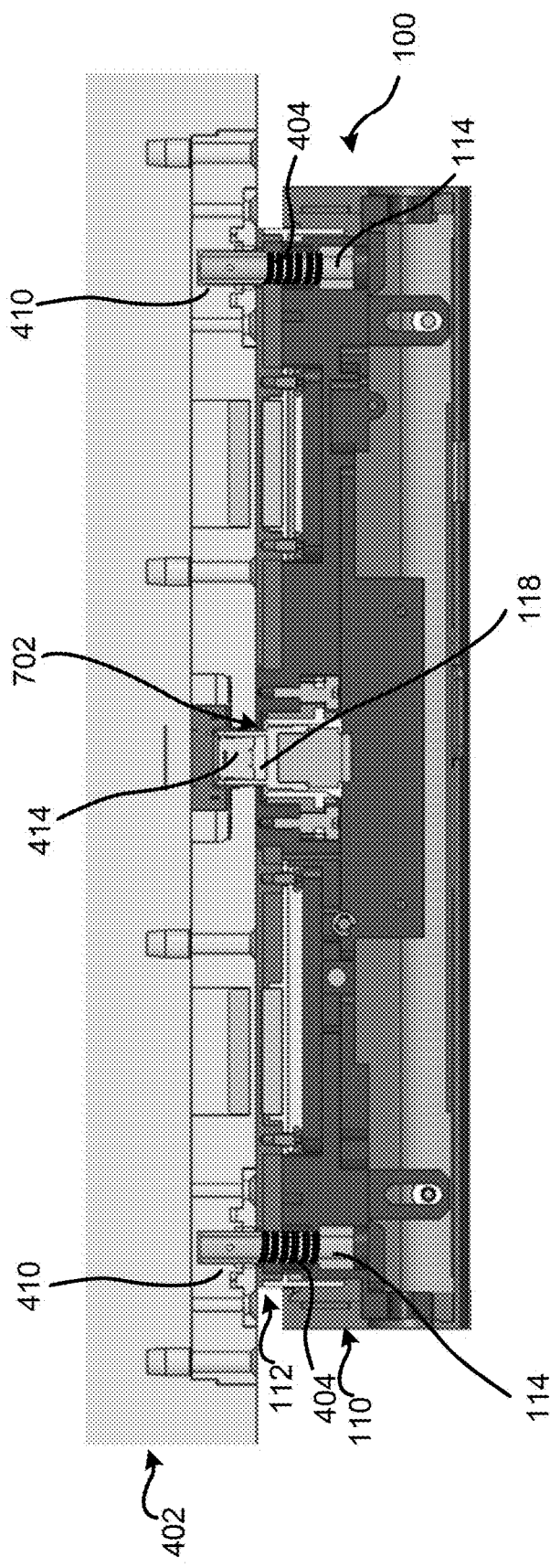

Referring now to FIG. 8, the docking station 100 and the information handling system 402 are in the second alignment stage, such that the connector 414 is fully inserted within connector 118. In this situation, full weight of the information handling system 402 can rest on the pop-out cover 112 to cause the springs 404 to further compress and the pop-out cover to slide farther within the case 110. In the second alignment stage, the posts 114 can be fully inserted within the openings 410, and the final alignment can be provided via the connector 118 moving within the opening 702 of the case 110. Additionally, any movement between the information handling system 402 and the docking station 100 while in the second alignment stage will not be transferring as a stress force on the connectors 118 and 414 based on the connector 118 floating with the case 110. The movement and floating of the connector 118 within the opening 702 of the case 110 will be discussed with respect to FIG. 9 below.

Figure 9:
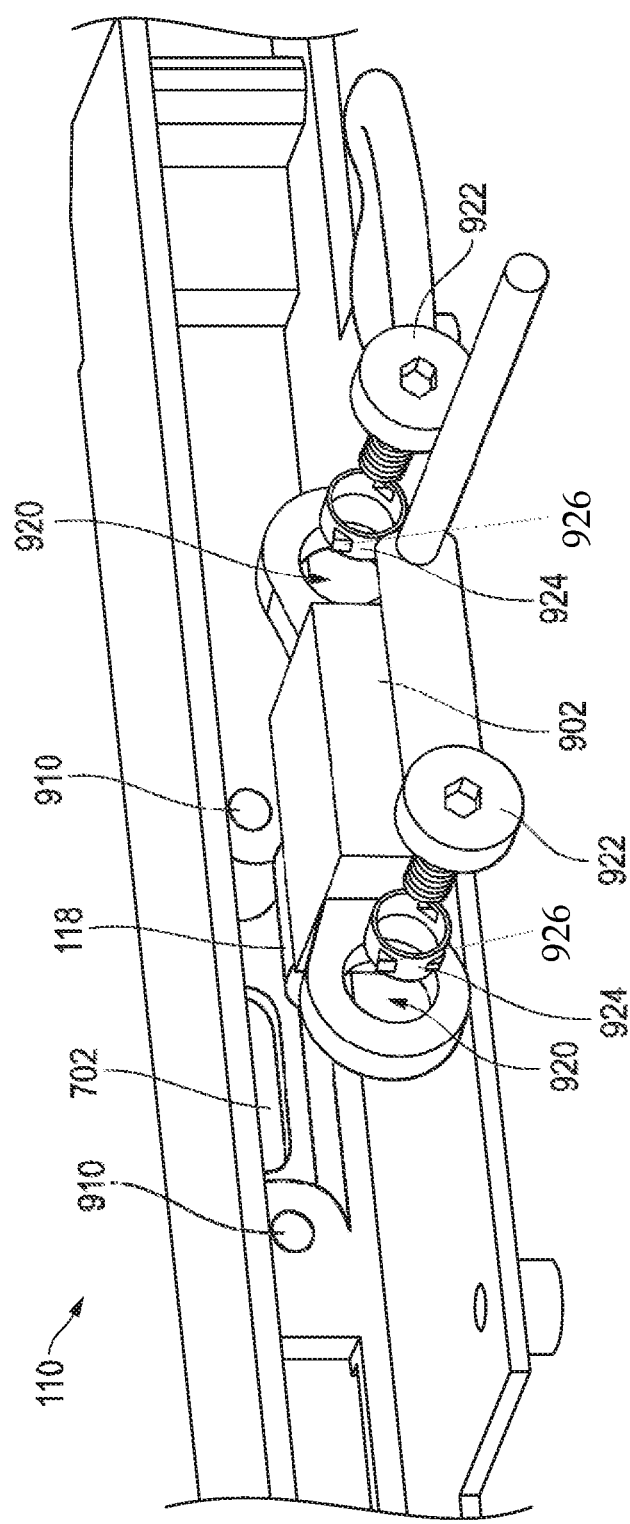
FIG. 9 illustrates an exploded diagram of a case and a connector over mold of the docking station in accordance with at least one embodiment of the present disclosure.

FIG. 9 illustrates an exploded diagram of the case 110 and a connector over mold 902 of the docking station 100 in accordance with at least one embodiment of the present disclosure. The case 110 includes openings 910 and 702. The connector over mold 902 includes openings 920 and the connector 118. In an embodiment, the connector over mold 902 can be connected to the case 110 via screws 922 and bushings 924. The bushings 924 can be placed within the openings 920 of the connector over mold 902, and the screws can be inserted through the bushings and then screwed into the openings 910 of the case 110.

The connector 118 can extend through the opening 702 in response to the screws 922 being fully screwed into the openings 910. The bushings 924 can include springs 926 hold the bushings in physical communication with both the openings 920 and with the screws 922. As the connector 118 moves within opening 702 to provide final alignment with connector 410, as described above with respect to FIG. 8, the springs 926 of the bushings can compress and/or release to allow the connector over mold 902 and the connector 410 to move in relation to the case 110. Additionally, once the connectors 118 and 410 are fully connected the springs 926 of the bushings 924 can compress and release as necessary to allow the connector over mold 902 and the connector 118 to float within the case 110.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A docking station comprising:
   a first connector mounted to float within a first opening of a case of the docking station;
   a bushing including a plurality of springs, wherein the first connector is mounted to the case via the bushing;
   a post in physical communication with the case, the post to provide a first alignment between the first connector and a second connector of an information handling system; and
   a pop-out cover in physical communication with the case and with the post, the pop-out cover biased in a first alignment stage, the pop-out cover to transition from the first alignment stage to a second alignment stage in response to a force exerted on the pop-out cover by a weight of the information handling system, wherein the force exerted on the pop-out cover causes the pop-out cover to transition to the second alignment stage and to slide within the case, wherein the pop-out cover surrounds the post and the first connector when the pop-out cover is in the first alignment stage, wherein the post and the first connector extend above a top surface of the pop-out cover when the pop-out cover is in the second alignment stage, wherein the first connector is joined with the second connector in response to pop-out cover being placed in the second alignment stage, the springs of the bushing to compress and release to allow the first connector to move in relation to the case to provide final alignment between the first connector and the second connector.

2. The docking station of claim 1 further comprising:
   a magnet located within the pop-out cover, the magnet to apply a force to a magnet of the information handling system, and to provide a rough alignment of the first connector and the second connector based on the force applied to the magnet of the information handling system.

3. The docking station of claim 2 wherein the rough alignment aligns the post and the first opening of the information handling system.

4. The docking station of claim 3 wherein the first alignment aligns the first and second connector with a finer alignment than the rough alignment.

5. The docking station of claim 1 further comprising:
   a spring in physical communication with the post, the spring is disposed between the case and the pop-out cover to bias the pop-out cover in the first alignment stage.

6. The docking station of claim 1 wherein the post extends within a second opening of the information handling system to provide the first alignment between the first and second connectors when the pop-out cover is in the second alignment stage.

7. The docking station of claim 1 wherein the post and the first connector are located below the top surface of the pop-out cover when the pop-out cover is in the first alignment stage.

8. A system comprising:
   an information handling system including:
     a first opening in a bottom surface of the information handling system; and
     a first connector located within the information handling system and behind the bottom surface; and
   a docking station including:
     a second connector mounted to float within a second opening of a case of the docking station;
     a bushing including a plurality of springs, wherein the second connector is mounted to the case via the bushing;
     a post in physical communication with the case, the post to provide a first alignment between the first connector and the second connector when the post is inserted within the first opening; and
     a pop-out cover in physical communication with the case and with the post, the pop-out cover biased in a first alignment stage, the pop-out cover to transition from the first alignment stage to a second alignment stage in response to a force exerted on the pop-out cover by a weight of the information handling system, wherein the force exerted on the pop-out cover causes the pop-out cover to transition to the second alignment stage and to slide within the case, wherein the pop-out cover surrounds the post and the second connector when the pop-out cover is in the first alignment stage, wherein the post and the second connector extend above a top surface of the pop-out cover when the pop-out cover is in the second alignment stage, wherein the first connector is joined with the second connector in response to pop-out cover being placed in the second alignment stage, the springs of the bushing to compress and release to allow the second connector to move in relation to the case to provide final alignment between the first connector and the second connector.

9. The system of claim 8 further comprising:
   a first magnet located within the pop-out cover, the first magnet to apply a force to a second magnet of the information handling system, and to provide a rough alignment of the first connector and the second connector based on the force applied to the second magnet.

10. The system of claim 9 wherein the rough alignment aligns the post and the first opening of the information handling system.

11. The system of claim 10 wherein the first alignment aligns the first and second connector with a finer alignment than the rough alignment.

12. The system of claim 8 further comprising:
a spring in physical communication with the post, the spring is disposed between the case and the pop-out cover to bias the pop-out cover in the first alignment stage.

13. The system of claim 8 wherein the post extends within a second opening of the information handling system to provide the first alignment between the first and second connectors when the pop-out cover is in the second alignment stage.

14. The system of claim 8 wherein the post and the first connector are located below the top surface of the pop-out cover when the pop-out cover is in the first alignment stage.

15. A docking station comprising:
a first connector mounted to float within a first opening of a case of the docking station;
a bushing including a plurality of springs, wherein the first connector is mounted to the case via the bushing;
a post in physical communication with the case, the post to provide a first alignment between the first connector and a second connector of an information handling system;
a first magnet located in between the first connector and the post, the first magnet to apply a force to a second magnet of an information handling system, and to provide a rough alignment of the first connector with a second connector of the information handling system based on the force applied to the second magnet;
a pop-out cover in physical communication with the case and the post, the pop-out cover biased in a first alignment stage, the pop-out cover to transition from the first alignment stage to a second alignment stage in response to a force exerted on the pop-out cover by a weight of the information handling system, wherein the force exerted on the pop-out cover causes the pop-out cover to transition to the second alignment stage and to slide within the case, wherein the pop-out cover surrounds the post and the first connector when the pop-out cover is in the first alignment stage, wherein the post and the first connector extend above a top surface of the pop-out cover when the pop-out cover is in the second alignment stage, wherein the first connector is joined with the second connector in response to pop-out cover being placed in the second alignment stage, the springs of the bushing to compress and release to allow the first connector to move in relation to the case to provide final alignment between the first connector and the second connector; and
a spring in physical communication with the post, the spring being disposed between the case and the pop-out cover to bias the pop-out cover in the first alignment stage.

16. The docking station of claim 15 wherein the first alignment aligns the first and second connector with a finer alignment than the rough alignment.

17. The docking station of claim 15 wherein the post and the first connector are located below the top surface of the pop-out cover when the pop-out cover is in the first alignment stage.

* * * * *